United States Patent Office 2,857,260
Patented Oct. 21, 1958

2,857,260

ISOPROPYL-3-CHLORO-6-METHYL PHENYL CARBAMATE AND HERBICIDAL COMPOSITIONS AND METHODS EMPLOYING THE SAME

Henry F. Woodward, Jr., Mission Hills, Kans., assignor to Spencer Chemical Company, a corporation of Missouri No Drawing. Application September 23, 1952
Serial No. 311,141

11 Claims. (Cl. 71—2.6)

This invention relates to isopropyl-3-chloro-6-methylphenyl carbamate, compositions capable of altering plant growth characteristics containing the same and a method of using the same.

Heretofore, the prior art has disclosed certain selective herbicides. For example, 2,4-D is widely known as a selective killer of broad leaved plants as distinguished from narrow leaved. Conversely, Sexton and Templeman of Imperial Chemical Industries discovered isopropyl phenyl carbamate and Virgil Freed of Oregon State College discovered isopropyl-3-chlorophenyl carbamate, both of which are effective in killing narrow leaved plants.

However, these prior art plant growth regulators when used in herbicidal concentrations suffer from the defect that they are not sufficiently selective in distinguishing between weed plants and crop plants. Their use is thus definitely limited broadly speaking to either control of narrow leaved weeds in broad leaved crops or control of broad leaved weeds in narrow leaved crops.

It is thus generally possible by the practice of the present invention to control and/or kill economically harmful plants commonly called weeds of both the narrow and broad leaf type in the presence of and without substantial harm to economically valuable crop plants of the narrow or broad leaved type as more particularly exemplified below through the use of isopropyl-3-chloro-6-methylphenyl carbamate.

The compound of this invention may thus be characterized as an economically selective herbicide in contrast to the prior art compounds which are merely botanically selective. The use of the word "weeds" in this specification and in the appended claims is in its normally accepted usage as meaning those plants whose presence in a crop planted field is economically undesirable.

The present material is normally applied before the weeds emerge from the ground. It does not prevent weed seeds from germinating, but permits germination in some way which is not understood and causes the plant to die or exhibit altered growth characteristics shortly after germination.

As an example of the lack of harmful effect of the material, it has been applied to growing wheat, soya beans, cotton and corn at the rate of 2 pounds, 4 pounds, 8 pounds and 16 pounds per acre on each of these plants before and after germination and has had no harmful effect on the growing plant in any of these dosages. So far as is now known other herbicidal carbamates when used at the higher rates damage these particular crops. When so used, this material permitted crab grass, rye grass, pigweed and wild mustard to germinate but the plants died shortly after germination.

The material may be applied by spraying as an oil solution, as a water emulsion, or by dusting, all in accordance with methods well known to those skilled in the art.

Its period of effectiveness after application to the soil is approximately six to eight weeks.

The carbamate of this invention may be applied to the soil surrounding the crop plant to be protected from harmful weed growth as an aqueous or oily spray or on an inert carrier such as diatomaceous earth, clay, talc, or any of the natural or mineral silicates with or without the use of a dispersing or wetting agent to increase the efficiency of contact with the weed seeds and/or emergent weed seedlings.

The carbamate of this invention in its effect on plants at various concentrations will vary with the formulation, particular method of application, the time of year, the age, species and variety of plant treated, as well as with climatic conditions.

The preferred dosage is normally in the range of 2 pounds up to 8 pounds per acre applied to the soil, but as already stated, dosages up to 16 pounds per acre have been used without deleterious effect upon the growing crop plants, nor does it harm crop plants such as the aforesaid even if applied when they are in the seedling stage.

The material may thus be used as a pre-emergent spray in a wide variety of situations. At a cost of $5.00 to $10.00 an acre, it can replace hand hoeing of cotton which could cost many times as much and yet will give superior results.

The product may be prepared from 3-chloro-6-methylaniline by reaction of two moles of the 3-chloro-6-methylaniline with one mole of urea under autogenous pressure in an autoclave or the like at 160° to 225° C. The reaction is best carried out in the presence of an excess of the aniline compound preferably from 3 to 1 to 10 to 1 molecular proportions. As a result of this reaction, the symmetrical di-substituted urea composition is formed and this material is separated and reacted with isopropyl alcohol in the ratio of 5 to 15 parts by weight of alcohol to 1 part of the substituted urea product. This reaction is likewise carried on under autogenous pressure at 160° to 225° C. to produce the isopropyl-3-chloro-6-methylphenyl carbamate. The mixture will also contain small amounts of unreacted disubstituted urea, the regenerated aniline compound and some unreacted alcohol. The carbamate is separated by conventional methods. The material is white, crystalline and has a melting point of approximately 98–99.5° C.

It is soluble in aromatic type solvents, it is reasonably soluble in ketones and alcohols and is insoluble in water.

The structural formula of the compound is:

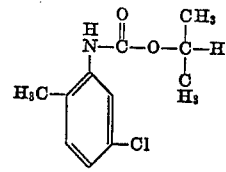

A preferred aqueous emulsion concentrate of the material will comprise:

48% isopropyl-3-chloro-6-methylphenyl carbamate
25% xylene
5% methylisobutyl ketone
8% kerosene (specific gravity .8 to 20° C.)
5% methyl alcohol
9% an emulsifying agent such as "Agrimul 60–AB"

This concentrate may be diluted with water and sprayed in conventional spraying equipment.

An oil concentrate may be prepared by taking 59% by weight of the herbicide and 41% kerosene. This concentrate may be diluted with kerosene to any desired degree and may be applied by conventional spraying equipment.

Another concentrate comprises 7½ pounds of the compound per gallon of the final mixture and the liquid remainder being 75% acetone and 25% methyl alcohol (approximately 2½ pounds per gallon). This mixture may be diluted with at least 3½ parts of kerosene and sprayed.

The herbicide may likewise be applied by dusting, using an inert dusting material together with a small proportion, such as 1/10 to 2% of herbicide.

If desired, the product may be combined with selective herbicides for broad leaf plants for example those of the 2,4-D class (halogenated phenoxy acetic acids) and used as a general herbicide.

The method of preparing the material from its corresponding aniline compound is generally described and claimed in an application of Archie J. Deutschman and Willard C. Bull, filed August 1, 1950, Serial No. 177,066, now Patent No. 2,677,698, issued May 4, 1954. Other methods of preparation may be employed.

The foregoing detailed description is given for clearness of understanding only and no unnecessary limitations should be understood therefrom as modifications will be obvious to those skilled in the art.

I claim:

1. Isopropyl-3-chloro-6-methylphenyl carbamate.
2. A concentrate comprising a liquid carrier and at least 25% of isopropyl-3-chloro-6-methylphenyl carbamate.
3. A herbicide composition comprising a liquid carrier and a small proportion of isopropyl-3-chloro-6-methylphenyl carbamate sufficient to be a phytotoxic concentration.
4. A composition as set forth in claim 3 in which the carrier is an aqueous emulsion.
5. A composition as set forth in claim 3 in which the carrier is oil.
6. A selective herbicide dust comprising an inert dust and a small proportion of isopropyl-3-chloro-6-methylphenyl carbamate sufficient to be a phytotoxic concentration.
7. The method of selectively killing weeds which comprises applying isopropyl-3-chloro-6-methylphenyl carbamate to weed seeds in concentration and amount sufficient to alter the growth characteristics of said weed seeds.
8. The method of selectively killing weeds which comprises applying isopropyl-3-chloro-6-methylphenyl carbamate to weed seeds in the presence of growing plants in concentration and amount sufficient to alter the growth characteristics of said weed seeds.
9. A composition for altering plant growth containing as an active ingredient a phytotoxic concentration of isopropyl-3-chloro-6-methylphenyl carbamate and a relatively inert diluent.
10. The method of altering the growth characteristics of growing plants which comprises treating growing plants with isopropyl-3-chloro-6-methylphenyl carbamate in concentration and amount sufficient to alter the growth characteristics of said plant.
11. The method of combating weeds which comprises applying a herbicidal concentration of isopropyl-N-(3-chloro-6-methylphenyl) carbamate to the environment in which weed growth is undesirable.

References Cited in the file of this patent

FOREIGN PATENTS 574,995    Great Britain _____ Jan. 30, 1946

OTHER REFERENCES

"Agricultural Chemicals," February 1951, page 37.
"Agricultural Chemicals," January 1952, page 27.
"Weeds," January 1953, pages 54 and 55.